United States Patent Office 3,510,218
Patented May 5, 1970

3,510,218
DOCUMENT AND BOOK SCANNING
COPYING APPARATUS
Walter Limberger, Hamburg-Poppenbuttel, Egon Opravil, Hamburg-Bergedorf, and George Cranskens, Wedel in Holstein, Germany, assignors to Lumoprint Zindler KG, Hamburg, Germany
Filed Sept. 20, 1967, Ser. No. 668,997
Claims priority, application Germany, Sept. 26, 1966,
L 54,640
Int. Cl. G03b 27/50, 27/70
U.S. Cl. 355—51
14 Claims

ABSTRACT OF THE DISCLOSURE

A copying apparatus includes a relatively elongated housing having a substantially horizontal upper surface formed, nearer to one end than to the other, with a transversely extending exposure slot. An optical system, including a light source, directs light through the exposure slot and reflected light is directed to a copying material guide. A series of transport rollers, each associated with a counter-pressure roller, is provided to extend to either side of the exposure slot. A flanged cover is hinged to the housing for swinging about an axis extending longitudinally of the upper surface of the housing, the counter-pressure rollers are mounted in this cover, and opposite flanges of the cover cooperate with the upper surface of the housing to form a guide for sheet copying material. Intermediate its ends, the housing carries guide surface means for sheet originals offset upwardly from the housing upper surface when the cover is in closed position. This guide surface means may be either opaque and slotted or may be transparent, and the upper surface of the guide surface means has a predetermined effective optical spacing from the upper surface of the housing. A transparent support for a book or the like to be copied is slidably guided for movement longitudinally of the upper surface of the housing, and is blocked from such movement when the cover is in the closed position. The upper surface of the transparent support has such predetermined effect optical spacing from the upper surface of the housing. The transparent support has flange means engageable between transport rollers and associated counter-pressure rollers for movement of the transparent support longitudinally past the exposure slot when the cover is raised. Drive means are provided to effect coordinated operation of the transport rollers for the original, whether sheet material or whether mounted on the transparent support, and transport rollers for the copying material moved through the copying material guide.

Description

The present invention relates to a copying apparatus with an exposure device arranged in the upper surface thereof, and possibly covered with a transparent material, associated with at least one light source and an optical arrangement, preferably with deflection, producing an image on a receiving surface along which the copying material is guided.

It is known in copying devices to move, above an exposure orifice a glass plate, acting as contact surface for the original. The carriage with the glass plate has a vertically adjustable, black cover of elastic material or rubber, which rests on the original. The carriage is guided and driven by gears and racks arranged thereon. According to this known solution, an original or a book can be moved along the exposure orifice with the same means and, in the case of a book or a thick original, the expenditure of the known construction is comparable to that of the invention. However, with a foliate original, the expenditure incurred with the known construction is substantially higher, because after passing the exposure orifice, the carriage has to be moved back into the starting position, before a new original may be inserted. In addition, the known construction has the drawback that the insertion of an original under the flexible, black contact foil requires a certain amount of manual work.

The invention has the object of providing an apparatus by means of which a foliate original can be easily processed, permitting several originals to be mounted tightly one behind the other, or one original to be reinserted immediately after the run-through, while the apparatus requires a minimum of manipulation for processing, for example, a thick original, such as a book, exactly and to pass the same along the exposure orifice. Contrary to the known construction, the invention is based on creating different conditions for passing a foliate original and for processing a book-like original, whereby the processing of a foliate original is facilitated or simplified, and wherein simple and cheap means are used.

According to the invention, preferably divided and driven transport rollers are arranged upstream and downstream of the orifice; the rollers project in sections over the upper surface of the apparatus; a liftable frame with mating rollers is provided, for transporting, between the driven and idling rollers a foliate copying material and, after lifting the frame, another original held against the transport rollers by contact pressure. In addition, a transparent contact surface on the upper surface of the apparatus outside the frame is provided with a guide extending in the direction of movement of the original to be copied, and the original may be guided along this contact surface over the transport rollers at a speed determined by the transport roller contact pressure, while the frame has been lifted.

This construction makes possible a simple processing of foliate material with the frame in position, while providing, after lifting the frame, a defined contact surface for transporting an original along the exposure orifice, without a positive or rigid engagement existing between the contact surface and the driving means, wherein, however, the combination between contact surface and drive rollers ensures uniform driving engagement and thus a certain driving speed with smooth contact, also with a book-shaped original.

Preferably, the frame comprises a transparent plate in the zone above the exposure orifice, with a channel above this plate for guiding the original, when the frame is placed on the upper surface. This transparent plate ensures uniform spacing of the original, irrespective of whether the contact surface is passed alongside the exposure orifice, or whether a foliate original is merely introduced into a slot between the upper surface and the frame placed on the upper surface.

Conveniently, the frame has the form of a flap hinge-mounted on one side, and at least two transparent rollers are provided under the upper surface of the apparatus in front of, and behind, the exposure orifice, with counter-rollers in the cover, adapted to move against spring pressure also perpendicularly to the surface plane. Preferably, two counter-rollers arranged one behind the other in the direction of movement, are mounted in yokes which are pivotable in the cover and movable against spring pressure perpendicularly to the upper surface. For example, the yokes may be adapted to pivot between two defining walls of the cover, and may be supported against the upper wall of the cover movably by means of a spring, while the lower wall of the cover has orifices permitting the counter-rollers to pass therethrough.

Preferably, the transparent plate is made from the same material as the contact surface and has the same thickness.

In another embodiment of the invention, the transparent plate is formed by a sheet metal strip with an orifice, mounted in a recess of the frame, with the original guided above this sheet metal strip, and wherein the guide plane is arranged at a smaller height, compared with the thickness of the transparent contact surface.

In order to produce reproductions with sharp edges, the original must always be accurately focussed. Hitherto, this problem has not been satisfactorily solved. If different means are used for passing through foliate and book-shaped originals, known constructions presented the difficulty that a glass plate with positive drive formed a distance from the exposure orifice determined by the thickness of the glass plate, making it necessary to guide also foliate originals correspondingly on a glass plate. The present invention eliminates the necessity of using the same means by providing a balance, while taking into consideration with different means the index of refraction of a transparent plate, which may, for example, also consist of plastics. If glass is used, a difference in the height of the guide of the order of magnitude of about one-third of the thickness of the glass plate has been provided.

According to a further feature of the invention, the longitudinal guide consists of a rail extending adjacent to the exposure slot, and carrying a guide web of the contact surface, equipped with a corresponding recess. On its side remote from the contact surface, the guide web has a strip-shaped extension, adapted to be moved within the zone of the transport rollers under contact pressure rollers which press the strip onto the transport roller sections. For example, with four transport rollers there are provided four contact pressure rollers, each associated with one transport roller, and spaced from the transport rollers by a distance smaller than the thickness of the guide strip. The produced contact pressure, further enhanced by the fact that the contact pressure rollers have elastically compressible surfaces, ensures a uniform transport effect even without substantial contact pressure by hand, while the longitudinal guide prevents tilting which might be caused by the torque due to the one-sided action of the contact pressure rollers.

Naturally, the drive of the contact pressure rollers is synchronized with the drive of guide rollers along the exposure surface, which may be supplied with a photosensitive material.

The invention will be further described, by way of example, with reference to the accompanying drawings, showing embodiments thereof, and in which.

Figure 1:
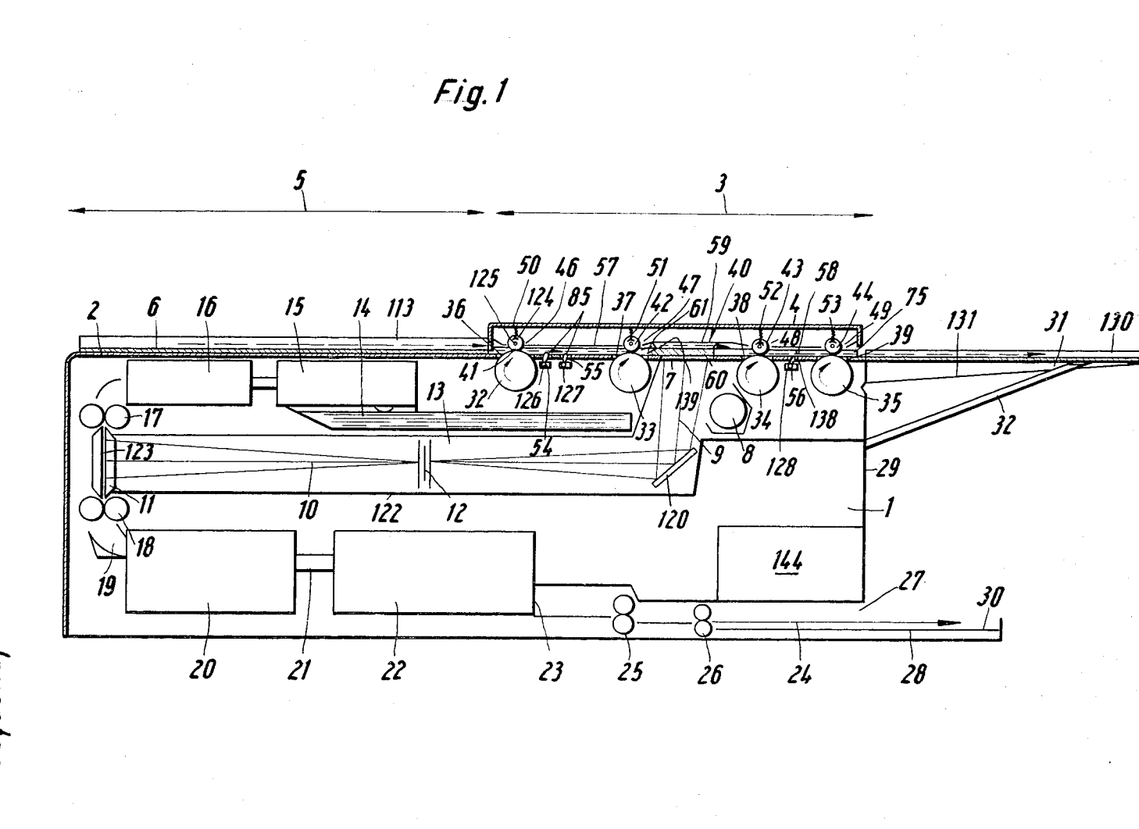
FIG. 1 shows a diagrammatical side elevation of an apparatus according to the invention, with closed cover, in cross-section.

According to FIG. 1, the apparatus comprises a housing 1. The upper side 2 of the housing 1 forms a part of the exposure device and is fully utilized by the parts of the exposure device. About one-half of the upper surface of the apparatus, seen in the longitudinal direction and indicated by an arrow 3, may be covered by a frame 4, constructed after the manner of a flap, while the other half, indicated by the arrow 5 serves for mounting a transparent, movable, supporting surface 6.

Under the section defined by the arrow 3, the upper surface formed by the closed plate contains an exposure orifice 7, associated within the apparatus with a light source 8, casting a reproducing beam 9, 10 onto a reproduction surface through the slot-shaped exposure orifice, extending perpendicularly to the plane of the drawing. The path of the beam, containing preferably an objective lens with reflection passes along a conduit 13. The reflection may be produced by a mirror 120 or a prism. The conduit 13 is formed by side walls or internal partitions of the housing and has an upper wall 121 and a lower wall 122. At its end remote from the orifice 7, it is open in the zone of the reproduction surface 11, or covered with a transparent material. Within the zone of the reproduction surface 11, there are arranged guide means 123 for a copying material.

Under the upper surface 2 and above the upper wall of the conduit 13, there is a stacking arrangement for the copying material; this stacking arrangement 14 comprises a delivery 15 for individual copying sheets and a preparation 16 for the copying material, for example, in the form of a loading device, while the reproduction surface 11 is associated with guides 123, and feed and transport rollers 17, 18, arranged in pairs, and mounted in the walls of the housing.

Underneath the reproduction surface 11, or the pair of rollers 18, there is the inlet 19 of a developer section 20, connected by a transport path 21 with a drier 22. The outlet 23 passes through a conduit 24, which may contain pairs of transport rollers 25, 26, to an outlet delivery opening 27 above the bottom 28 of the apparatus and arranged in the front face 29, near which also the exposure device orifice 7 may be arranged. The opening 27 may lead into a receiving tray 30 extending over the front wall 29 of the apparatus.

Aligned with the upper surface 2 of the apparatus and adjacent to the front wall 29 is a table 31, for example mounted detachably or foldably and supported by stays 32, serving to receive the original passing past the exposure orifice 7 or serving as supporting surface 6, if the same is moved past the exposure orifice.

The table 31 is equipped with a guide rib 130, forming an extension of the longitudinal guide 75 for the original on the upper side 2 of the apparatus. This rib reduces the risk of tilting of the contact surface 6 when leaving the rollers 35 and 44. Furthermore, the table has in its centre portion a downwardly sloping plane 131 for receiving the originals so that a step is formed at the delivery behind the rollers 35 and 44, and later originals are not obstructed by those already deposited. The transverse dimension of the sloping plane 131 is smaller than the contact surface 6, enabling the latter to rest on the horizontal edge zones of the receiving table 31.

In principle, the apparatus has under the top surface in the zone indicated by the arrow 3, for example, four transport rollers 32, 33, 34, 35 which are so arranged that parts of their peripheries protrude above the upper surface of the apparatus through openings 36, 37, 38, 39. All transport rollers 32–35 are driven through drive means in a clockwise direction. The rollers are mounted in side walls or partitions within the apparatus.

As shown diagrammatically in FIG. 1, the frame 4 is fitted as cover 40 over the top surface within the zone of the arrow 3. Counter-pressure rollers 41, 42, and 43, 44, respectively are freely rotatably mounted in this cover. The cover is provided with a closed top plate 45 and with a bottom plate 57, equipped with holes 46, 47, 48, 49, through which protrude peripheral sections of the counter-pressure rollers 41–44. The counter-pressure rollers are affected either individually or in pairs, as described further below, by springs 50, 51, 52, 53 which urge these counter-pressure rollers in the direction of the transport rollers 32–35. As shown with reference to the counter-pressure roller 41, the springs 50–53 press on bearing means 124 embracing the pins 125 of the counter-pressure rollers 41–44 from the top.

It may be seen that switch arms 54, 55 protrude in front of the slot 7 between the transport rollers 32, 33 and the counter-pressure rollers 41, 42, and a switch arm 56 between the transport rollers 34, 35 and the counter pressure rollers 43, 44, through holes 85, 138 in the upper surface of the housing. Since these switch arms are always located between two transport and counter-pressure rollers, the original is correctly guided in this zone and the associated switches 126, 127, 128 are correctly operated. The switches are arranged under the cover plate forming the upper surface. The switch arm 54 may serve, e.g., for switching on the transport mechanism for the photosensitive material, the switch arm 55 for energizing the light source and the switch arm 56 may cause the light source to be switched off on release. The circuit diagram also shows the switching of a loading device 16.

It may be seen that the cover plate 57 is arranged in spaced relationship from the upper surface 2 of the apparatus, leaving open a channel 58 for guiding the original, as indicated by the arrow. The gap is adjusted by an edge web 129 and by hinge means 83, 84 on the free edge of the cover. It may also be seen that the cover plate 57 has, above the exposure orifice 7 a convex or raised section containing a transparent plate 60. The upstream end 61 of the plate 60, viewed in the direction of movement of the copying material, is tapered or bent downwardly so as to form a ramp over which the copying material is guided to the upper surface of the plate 60. The end faces of the plate 60, extending parallel to the plane of the drawing, are mounted in the frame or cover 40 by means 139 so that the underside of the plate 60 is substantially in alignment with the upper surface 2 of the apparatus, while the upper surface of the plate 60 has, according to the material used, a spacing from the upper surface 2 of the apparatus which is, with regard to the exposure device and to the materials used, equal to the effective distance through which another original would be guided with removed cover or frame 40 by means of the transparent plate 6 over the exposure orifice 7.

Figure 2:
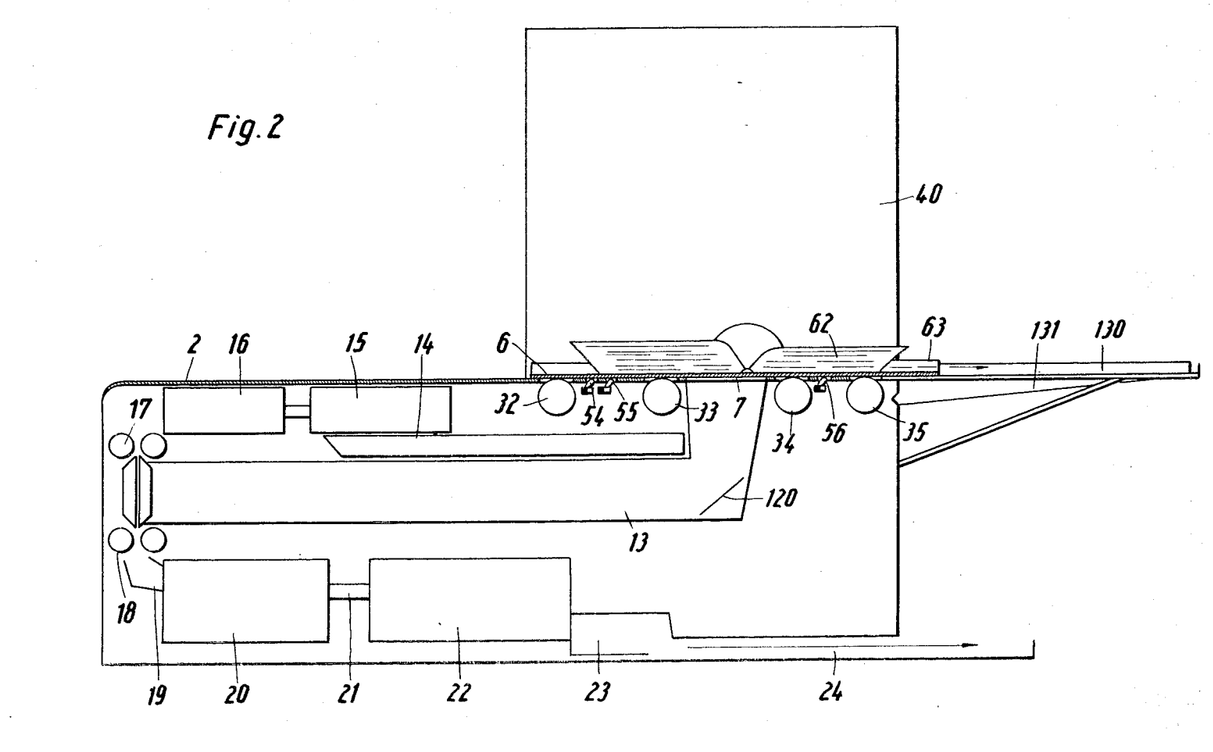
FIG. 2 is a side elevation corresponding to FIG. 1, with raised, diagrammatically indicated cover, showing another operational position.

This state is represented in FIG. 2. The frame or cover 40 is raised, the parts are not shown in detail. The transparent contact surface 6 is shown in position above the exposure slot 7, resting on the transport rollers 32, 33, 34, 35 and all switching arms 54, 55, 56 are deflected. The original is a book 62, mounted on the contact surface 6. As indicated, the contact surface 6 has a raised portion 63 as guide web on the side remote from the viewer.

Figure 3:
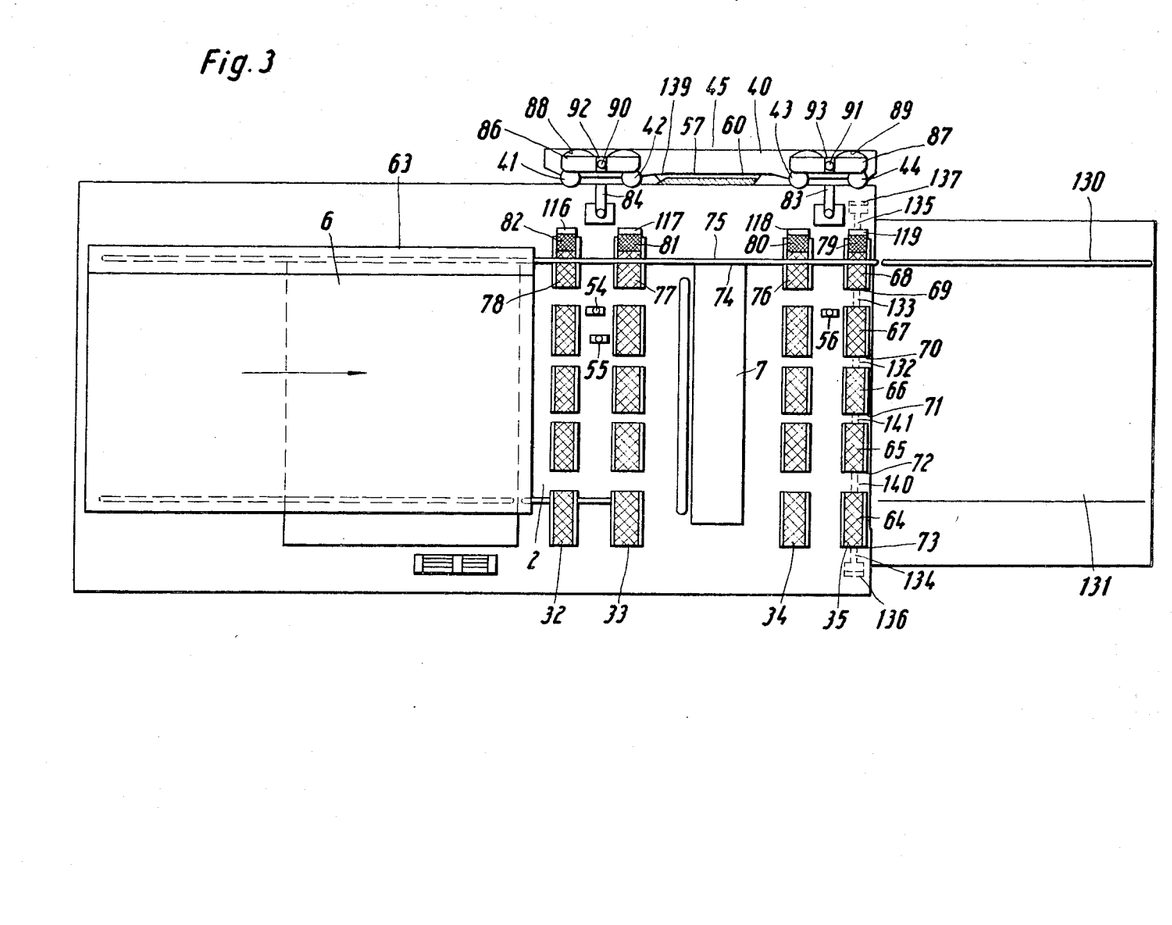
FIG. 3 is a top view of the apparatus of FIGS. 1 and 2 with lifted cover in the starting position of FIG. 1.

FIG. 3 is a top view of the apparatus of FIG. 1 with raised cover or frame 40 with the contact surface 6 in the starting position, and with transport rollers 32, 33, 34, 35, divided by radial notches into several sections, for example, five sections, wherein webs may remain between these sections projecting from the upper surface 2. The peripheral sections, shown by way of example with transport roller 35 at 64, 65, 66, 67, 68 project from openings 69, 70, 71, 72, 73 in the upper surface. The same is also valid with regard to the other transport rollers. The portions with reduced diameter, or the roller spindles 140, 141, 132, 133, located between the said peripheral sections, are below the level of the upper surface 2.

The ends are shown to be provided with stub axles 134, 135 mounted in bearing means 136, 137 below the level of the upper surface 2. The transmissions are connected with the rollers within the zones of these mountings.

FIG. 3 shows also the switch arms 54, 55, 56 and the exposure orifice 7.

A rail 75 is mounted parallel to an end face 74 of the exposure orifice 7, bridging the transport roller sections 69, 76, 77, 78, and contact pressure rollers are provided at 79, 80, 81, 82 above the upper surface 2 on the outside of the said rail. This arrangement will be explained later with reference to FIG. 8. The transport roller sections may be recessed within the region of the rail. The contact pressure rollers are mounted on lateral, substantially L-shaped supports 116–119, enabling a strip-shaped extension 115 to engage between the contact pressure rollers and the associated transport roller sections, as described further below.

As shown in FIG. 3, the frame 40 is a hinge-mounted member, having hinges 83, 84. Between an upper closure plate 45 and a lower closure plate 57, the counter-pressure rollers 41, 42, and 43, 44, respectively, are mounted in pairs in pivoting bridges 86, 87 which are also adapted to carry out a translatory movement and are supported on the upper plate 45 by means of spring clips 88, 89. The pivoting motion can be determined by a pin 90, 91, mounted in the side walls of the cover, and passing vertically or perpendicularly to the closure plate 45 through slots 92, 93 in the pivoting bridges. These bridges 86, 87 may be made integrally with the springs 88, 89 of a synthetic resin.

Figure 4:
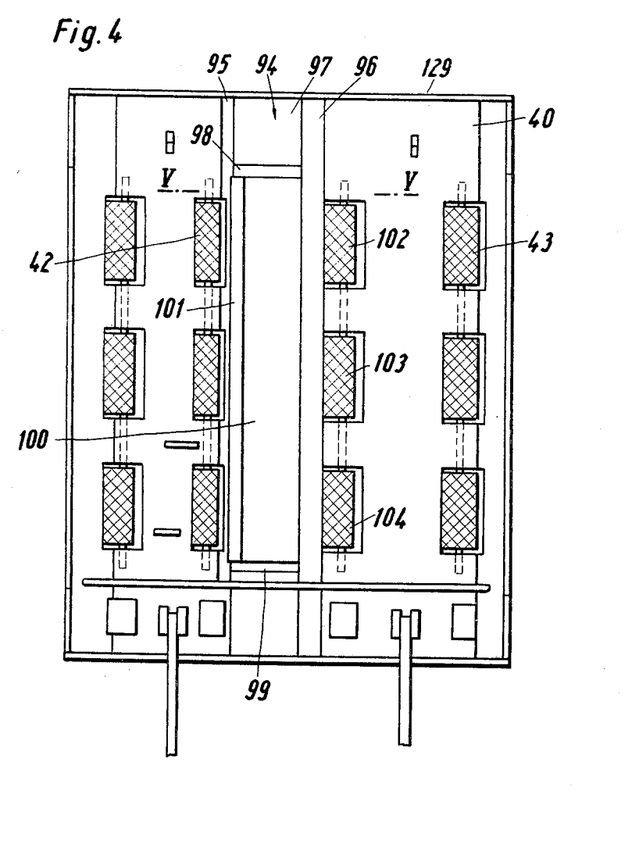
FIG. 4 shows the underside of the cover in one embodiment of the invention.
Figure 5:
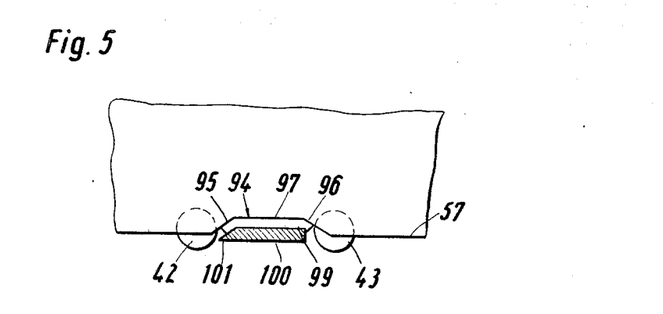
FIG. 5 is a cross-section along the line V—V in FIG. 4.
Figure 6:
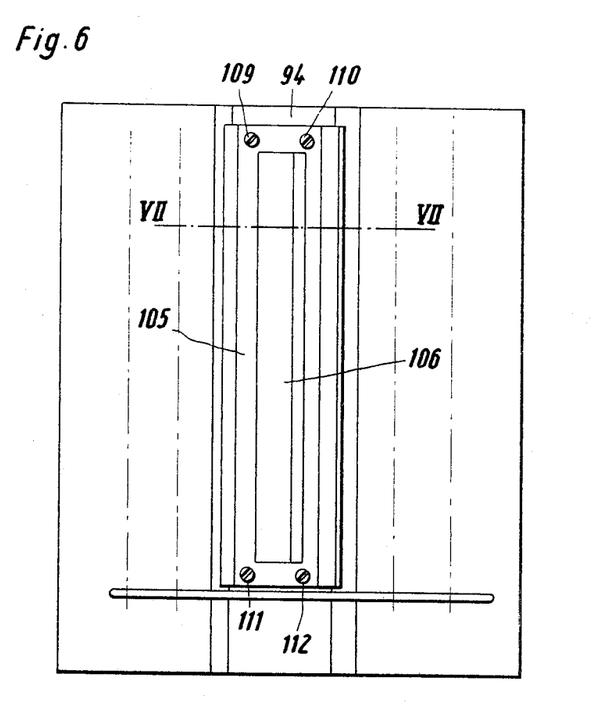
FIG. 6 shows part of the underside of a cover, illustrating a special embodiment of the transparent plate as slotted plate.
Figure 7:
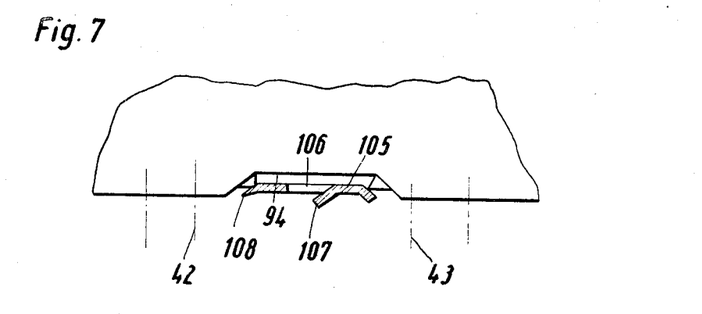
FIG. 7 is a cross-section along the line VII—VII of FIG. 6.

As shown in FIGS. 4 and 5, the underside of the frame or cover 40 has, in the region of the exposure orifice 7, an upwardly extending recess 94, extending transversely of the direction of movement of the contact surface. The same raised recess is also shown in FIGS. 6 and 7, and is indicated, for example, at 59 in FIG. 1. The recess in the lower closure plate 57 has sections 95, 96, obliquely extending upwardly, as well as a top wall 97, connecting the upper ends of these oblique portions. Arranged in this recess 94 and on side walls 98, 99, extending parallel to the direction of movement, is a plate 100 (corresponding to the plate 60 in FIG. 1) which tapers at 101 in the direction opposite to the direction of movement. The conduit, indicated by the broken arrow 58 in FIG. 1, passes over this plate. With closed design of this plate, as in FIGS. 4 and 5, the plate is transparent. This plate has the object of guiding a foliate original at the same distance over the exposure slot 7 as if, (e.g., in FIG. 2) a book 62 were guided by means of the contact plate 6. Since the contact plate is moved by the transport rollers 32–35 slightly above the upper surface 2, it takes into consideration the index of refraction of the plate 100 so that the original passes over the surface 2 at the same effective distance as the book 62 on the contact face 6.

It may be seen from FIGS. 4 and 5 that the counter-pressure rollers 42, 43 are also sub-divided into roller sections, shown, e.g., for the contact roller 43 at 102, 103, 104. These sections may be arranged on the same roller spindle and are entrained by the transport rollers 32–35, when the cover 40 is lowered.

In FIGS. 6 and 7, the plate, shown at 105 is made of an opaque material and is mounted in the cover 40 in the same way as the plate 100. The opaque plate has a slotted opening 106 above the exposure slot 7. Since this opening is free from material, the upper surface of the plate 105 must be lower than the upper surface of the plate 100 relative to the surface 2 of the apparatus, so as to produce again the same effective distance with a view to perfect focussing.

The trailing edge 107 of the slot is downwardly convex, to ensure good passage of the copying material. The leading edge 108 is also bent downwardly. The drawing also shows the mounting means 109, 110, 111, 112 outside the longitudinal extent of the exposure slot 7.

Figures 8, 9:
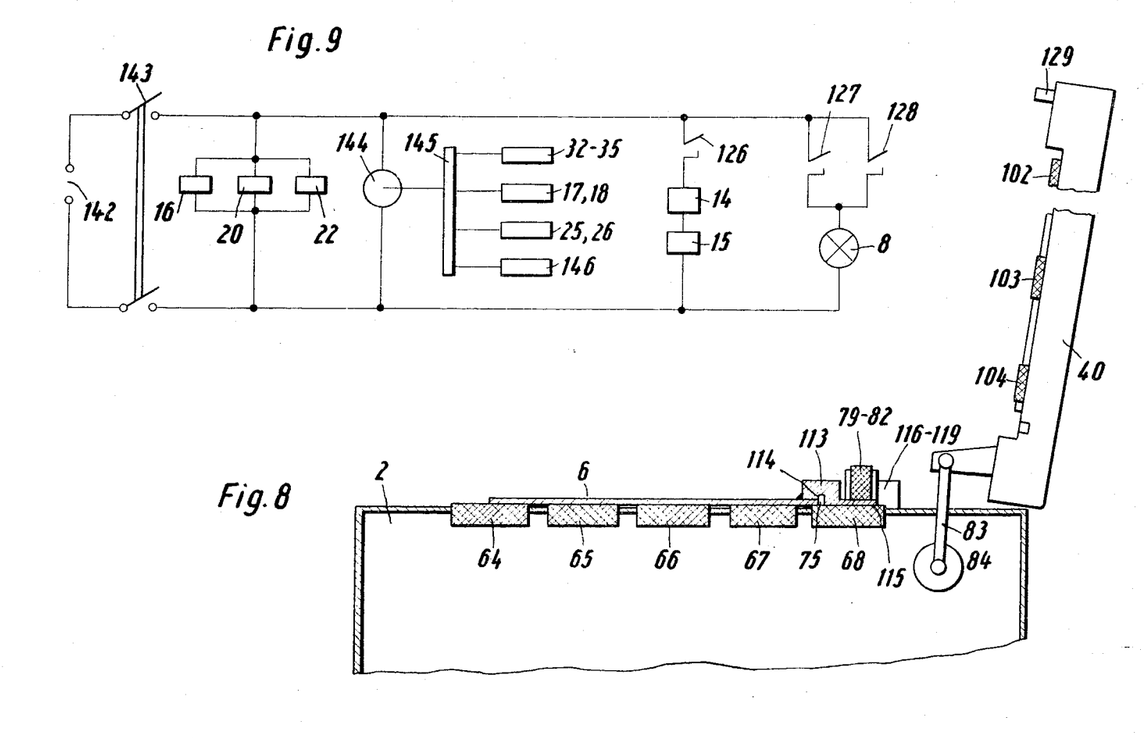
FIG. 8 is an end view of the device with raised cover, for example corresponding to FIG. 2.
FIG. 9 shows diagrammatically the drive circuit.

FIG. 8 is an end view showing the upper surface 2, the cover 40 with the counter rollers or counter-roller sections 104, 103, 102, the contact surface 6 on the roller sections 64, 65, 66, 67, 68 of a transport roller, mounted and driven below the contact surface. The contact surface, which may be a glass plate, is guided along a rail 75 located above the roller section 68. The contact surface of glass or transparent plastic has a guide web 113

(corresponding to the guide web 63 in FIGS. 3 and 2) with a recess 114 corresponding to the rail 75. On the side of the guide web remote from the contact surface 6, there is a strip-shaped extension 115 extending under the contact pressure rollers 79–82 (FIG. 3). The contact pressure rollers press this strip-shaped extension 115 against the section 68 of the transport rollers and cause thereby automatically the forward motion without requiring special contact pressure. The contact pressure rollers 79–82 have elastic surfaces and are so guided in the supports 116–119, in which they are freely rotatable, that the free gap between the roller sections and the associated sections of the transport rollers is smaller than the thickness of the strip-shaped projection 115. During the entry of the projection 115, the elastic compression of the roller surface ensures the transport engagement of the transport rollers and the rail 75 prevents the tilting of the contact surface which might be caused by the one-sided engagement of the drive.

With closed cover 40, there are means which prevent the insertion of the contact surface 6. In the embodiment shown, this means is a part 113 so formed that its height exceeds the inlet slot in the cover 40.

The cover 40 has one or more recesses through which the contact pressure rollers may pass and into which they are pressed when the cover is closed. The dimensions of these recesses are such that the rollers cannot completely pass therethrough.

FIG. 9 shows diagrammatically the drive circuit of the apparatus. The circuit is connected to a power source 142 and may be energized by means of a mains switch 143, causing the units 16, 20 and 22 in FIG. 1 to be switched on. At the same time, also the drive motor 144 is energized, which may be arranged as shown in FIG. 1. This motor drives a transmission 145 leading to the rollers 32–35, 17, 18, 25, 26 and a group of rollers 146. This group symbolizes the transmission arrangements in the units 16, 20, 22 and in the link 21. The transmission 145 drives all rollers in such a way that the paper feed is constant.

The switch 126 in FIG. 1 serves to start the transport for the copying paper. Thus, after closing the main switch 143, during the passage of the original or of the plate 6, the transport mechanism for the copying paper is started up in the units 14, 15.

The light source 8 is energized by the two switches 127, 128, connected in parallel, of which the switch 128 causes the light source to be energized when the trailing edge of the original or of the plate 6 has left the switch 127.

We claim:

1. Apparatus for making copies, comprising, in combination, a housing, an upper cover plate on said housing, a slot-shaped exposure orifice extending transversely of said cover plate, an exposure device arranged within said housing and including a light source and an optical arrangement, the optical arrangement extending between said exposure slot and a receiving surface within said housing, guide means in said housing at said receiving surface for passing a copying material along said receiving surface, openings in said cover plate in front of and behind said exposure slot, transport rollers, arranged within said housing in the zone of said cover plate partly within said openings, extending parallel to the longitudinal extent of said exposure slot and projecting, in sections, beyond said cover plate, a cover frame positioned on said housing for upward displacement relative to said housing, within the region of said exposure slot, above said cover plate, drive means mounted within said housing and driving said transport rollers and said guide means synchronously for transporting uniformly the original and the copying material, a substantially flat transparent support, forming a contact surface, mounted on said cover plate for movement longitudinally therealong past said exposure orifice, said transparent support normally being positioned outside the zone of said cover frame, said cover frame defining a guide channel, in the zone of said transport rollers, for moving sheet originals longitudinally of said cover plate, by said transport rollers, and past said exposure orifice; said transparent support being arranged to have a book-shaped original positioned on its contact surface and, when said cover frame is moved upwardly and away from said cover plate, being movable into engagement with said transport rollers for movement of the book-shaped original on its contact surface longitudinally of said cover plate past said exposure orifice, whereby sheet originals and said transparent support are moved at the same speed longitudinally of said transport surface and in synchronism with the movement of said copying material along said receiving surface.

2. An improved apparatus for making copies, comprising a housing (1), an upper cover plate (2) on the said housing, a strip- or slot-shaped exposure orifice (7) in the said cover plate, an exposure device, comprising a light source (8) and an optical arrangement (120, 12), arranged within the said housing and extending between the exposure slot (7) and a receiving surface (11) within the housing, guide means (17, 18, 123) arranged in the housing at the said receiving surface and adapted to pass a copying material along the said receiving surface, openings (36–39) in front of, and behind the exposure slot (7) in the cover plate (2), transport rollers (32–35), arranged within the housing in the zone of the cover plate, partly within the said openings, parallel to the longitudinal extent of the exposure slot (7) and projecting in sections beyond the cover plate (2), a frame (4, 40) adapted to be lifted in the region of the exposure slot (7) and hinged to the housing (1) above the cover plate (2), drive means mounted within the said housing, for driving the said transport rollers (32–35) and the said guide means (17, 18, 123) synchronously and for transporting uniformly the original and the copying material, a transparent contact surface (6), mounted movably on the cover plate (2) of the housing outside the position of the frame (40) and adapted to be moved after lifting the frame (40) in the direction of movement of the original and in contact with the transport rollers (32–35) over the exposure slot (7), wherein an original is arranged on the said contact surface (6) and the speed of movement of the contact surface is determined by contact pressure on the transport rollers (32–35), the upper surface of the cover plate comprising a longitudinal guide extending in the direction of movement of the original past the exposure slot and means between the contact surface and said guide for guiding the contact surface at the cover plate over the exposure slot after lifting the frame.

3. Apparatus as claimed in claim 1 including a sheet original guide positioned in said cover frame in alignment with said exposure slot when said cover frame is closed against said cover plate, said guide having a sheet original guide surface extending substantially parallel to said cover plate, and said guide being arranged for exposure of sheet originals passing over said guide surface and past said exposure orifice, said sheet original guide surface having an effective optical spacing from said cover plate equal to the effective optical spacing of said contact surface of said transparent support from said cover plate, and a guide means at said sheet original guide and included in said sheet original guide channel of said cover frame.

4. An improved apparatus for making copies, comprising a housing (1), an upper cover plate (2) on the said housing, a strip or slot-shaped exposure orifice (7) in the said cover plate, an exposure device, comprising a light source (8) and an optical arrangement (120, 12), arranged within the said housing and extending between the exposure slot (7) and a receiving surface (11) within the housing guide means (17, 18, 123) arranged in the housing at the said receiving surface and adapted to pass a copying material along the said receiving surface, openings (36–39) in front of, and behind the exposure slot (7) in the cover plate (2), transport rollers (32–35), arranged within the housing in the zone of the cover plate, partly within the said openings, parallel to the longitudinal extent of the exposure slot (7) and projecting in sections beyond the cover plate (2), a frame (4, 40) adapted to be lifted in the region of the exposure slot (7) and hinged to the housing (1) above the cover plate (2), drive means mounted within the said housing, for driving the said transport rollers (32–35) and the said guide means (17, 18, 123) synchronously and for transporting uniformly the original and the copying material, a transparent contact surface (6), mounted movably on the cover plate (2) of the housing outside the position of the frame (40) and adapted to be moved after lifting the frame (40) in the direction of movement of the original and in contact with the transparent rollers (32–35) over the exposure slot (7), wherein an original is arranged on the said contact surface (6) and the speed of movement of the contact surface is determined by contact pressure on the transport rollers (32–35), the frame being a flap-cover hingedly-mounted at one side, hinge means between said flap cover and the housing and at least two rows of holes with transport rollers in front of, and behind, the exposure slot, and further comprising associated contact pressure rollers in the flap cover in front of, and behind, said exposure slot, mounted in bearing means with resilient elements, whereby said counter-pressure rollers are movable against the action of said spring means perpendicularly to the plane of said cover plate.

5. An apparatus as set forth in claim 4, wherein the counter-pressure rollers (41–44) are mounted rotatably in the frame (40) parallel to the transport rollers (32–35) and in alignment therewith, and rest thereagainst when the frame (40) is fitted.

6. An apparatus as set forth in claim 4, comprising two rows of transport rollers (32, 33, 34, 35) arranged always upstream and downstream of the exposure slot (7) and correspondingly four rows with counter-pressure rollers (41–44) in the frame (40), pins (90, 91) arranged always between two rows of counter-pressure rollers in the cover and extending parallel to the axes of the counter-pressure rollers, pivot straps (86, 87) on said frame (40) and mounted pivotably and movably vertically to the plane of frame on the said pins (90, 91), wherein the mounting means have slots (92, 93) in the pivot straps extending in this vertical direction and comprising spring means (88, 89) tending to push the pivot straps towards the bottom out of the frame (40).

7. An improved apparatus for making copies, comprising a housing, an upper cover plate on the said housing, a strip or slot-shaped exposure orifice in the said cover plate, an exposure device, comprising a light source and an optical arrangement, arranged within the said housing and extending between the exposure slot and a receiving surface within the housing guide means arranged in the housing at the said receiving surface and adapted to pass a copying material along the said receiving surface, openings in front of, and behind the exposure slot in the cover plate, transport rollers, arranged within the housing in the zone of the cover plate, partly within the said openings, parallel to the longitudinal extent of the exposure slot and projecting in sections beyond the cover plate, a frame adapted to be lifted in the region of the exposure slot and hinged to the housing above the cover plate, drive means mounted within the said housing, for driving the said transport rollers and the said guide means synchronously and for transporting uniformly the original and the copying material, a transparent contact surface, mounted movably on the cover plate of the housing outside the position of the frame and adapted to be moved after lifting the frame in the direction of movement of the original and in contact with the transparent rollers over the exposure slot, wherein an original is arranged on the said contact surface and the speed of movement of the contact surface is determined by contact pressure on the transport rollers, a transparent plate arranged in the frame in the region above the exposure slot, and guide means at this transparent plate, located with fitted frame on the upper surface of the cover plate and defining towards the bottom a channel for the original extending within said frame, the transparent plate being made from the same material as the contact surface and having the same thickness as the contact surface.

8. An improved apparatus for making copies, comprising a housing, an upper cover plate on the said housing, a strip or slot-shaped exposure orifice in the said cover plate, an exposure device, comprising a light source and an optical arrangement, arranged within the said housing and extending between the exposure slot and a receiving surface within the housing guide means arranged in the housing at the said receiving surface and adapted to pass a copying material along the said receiving surface, openings in front of, and behind the exposure slot in the cover plate, transport rollers, arranged within the housing in the zone of the cover plate, partly within the said openings, parallel to the longitudinal extent of the exposure slot and projecting in sections beyond the cover plate, a frame adapted to be lifted in the region of the exposure slot and hinged to the housing above the cover plate, drive means mounted within the said housing, for driving the said transport rollers and the said guide means synchronously and for transporting uniformly the original and the copying material, a transparent contact surface, mounted movably on the cover plate of the housing outside the position of the frame and adapted to be moved after lifting the frame in the direction of movement of the original and in contact with the transparent rollers over the exposure slot, wherein an original is arranged on the said contact surface and the speed of movement of the contact surface is determined by contact pressure on the transport rollers, a transparent plate arranged in the frame in the region above the exposure slot, and guide means at this transparent plate, located with fitted frame on the upper surface of the cover plate and defining towards the bottom a channel for the original extending within said frame, the transparent plate being a sheet metal strip mounted in a recess of the frame, and having an opening in the zone of the exposure slot, wherein the channel for guiding the original is defined in the zone of the exposure slot towards the bottom by the sheet metal strip, and the guide plans of this channel, formed by the top surface of the sheet metal strip, is arranged at a smaller distance above the top surface of the cover plate than would correspond to the thickness of the transparent contact surface.

9. An apparatus as set forth in claim 2, wherein the longitudinal guide (75) is a rail, extending along the cover plate adjacent to the slot-shaped exposure orifice (7) and forming an elongated profile on the cover plate (2), wherein the contact surface (6) has engaging means corresponding to the profile, adapted to engage into the rail and causing the contact plate (6) to be guided parallel.

10. An apparatus as set forth in claim 9, wherein the said profile is an upwardly projecting rail (75), and the engaging means have at the contact surface (6) a guide web (113) with a corresponding recess (114), fitted onto the said rail, wherein the guide web (113) arranged at one edge of the contact plate (6) has, on the side remote from the contact plate (6), a strip-shaped projection (115) which moves during the movement of the contact plate (6) over sections of the transpor rollers (32–35), wherein the cover plate (2) is provided with mountings (116–119) and retaining rollers (79–82) are so mounted in these mountings that they are located above that section of the transport rollers (32–35) on which the strip-shaped extension moves, and wherein the retaining rollers are so arranged relative to the transport rollers that they urge the strip-shaped projection (115) onto the transport roller sections.

11. An apparatus as set forth in claim 10, comprising the same number of retaining rollers (79–82) as transport rollers (32–35), and the retaining rollers (79–82) are always aligned with one transport rollers and, in order to determine the dimensioning of the mountings (116–119) and the retaining rollers, a gap is formed between the latter and the transport rollers, which gap is narrower than the thickness of the strip-shaped projection (115).

12. An apparatus as set forth in claim 10, wherein the upwardly projecting guide web (113) forms an abutment in front of an insertion orifice formed by the lowered frame (40), between this frame (40) and the cover plate (2).

13. An apparatus as set forth in claim 10, comprising a receiving table (31) in the extension of the cover plate on the housing of the apparatus, wherein a guide rib (130) is arranged on the table in the extension of the rail (175)) and the centre of the said table (31) forms a sloping, downwardly extending plane (130), located with its lower end adjacent to the housing cover plate and forming a step therewith, and wherein the sloping plane is narrower transversely than the contact surface (6).

14. An apparatus as set forth in claim 2, wherein the cover plate is arranged between the openings for the pairs of transport rollers (32, 33, and 34, 35) in front of and behind the exposure slot (7), the housing comprising switches (126, 127, 128) with switch arms (54, 55, 56), the said switch arms extending through the said holes and projecting above the surface of the cover plate, and adapted to be moved out of the path of a part by the projecting edges of a part comprising an original and the contact surface.

References Cited

UNITED STATES PATENTS

| | | | |
|---|---|---|---|
| 2,959,095 | 11/1960 | Magnuson | 355—49 |
| 3,267,797 | 8/1966 | Fowlie et al. | 355—8 X |
| 3,330,181 | 7/1967 | Jakobson | 355—66 X |
| 3,389,635 | 6/1968 | Teutsch | 355—66 |

NORTON ANSHER, Primary Examiner

R. A. WINTERCORN, Assistant Examiner

U.S. Cl. X.R.

355—66